United States Patent
Montagne et al.

(10) Patent No.: US 7,867,296 B2
(45) Date of Patent: Jan. 11, 2011

(54) HIGH ETHANOL-CONTENT FUEL COMPOSITIONS

(75) Inventors: Xavier Montagne, Rueil-Malmaison (FR); Bertrand Lecointe, Triel sur Seine (FR); Ludivine Pidol, Cachan (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 256 days.

(21) Appl. No.: 12/276,565

(22) Filed: Nov. 24, 2008

(65) Prior Publication Data
US 2009/0139136 A1 Jun. 4, 2009

(30) Foreign Application Priority Data
Nov. 30, 2007 (FR) .................................. 07 08375

(51) Int. Cl.
*C10L 1/18* (2006.01)
(52) U.S. Cl. .......................................... 44/388; 44/451
(58) Field of Classification Search .................. 44/388, 44/451
See application file for complete search history.

(56) References Cited

U.S. PATENT DOCUMENTS

| 4,509,953 | A | 4/1985 | Itow et al. |
| 7,323,020 | B2 * | 1/2008 | Hull et al. ...................... 44/451 |
| 2002/0026744 | A1 * | 3/2002 | Golubkov et al. ............. 44/436 |
| 2003/0126790 | A1 | 7/2003 | McCoy |

FOREIGN PATENT DOCUMENTS

| CA | 2109840 | * | 5/1992 |
| DE | 41 16 905 | C1 | 8/1992 |
| DE | 43 33 418 | C1 | 10/1994 |
| WO | WO9502654 | * | 1/1995 |
| WO | WO 2007/145490 | A1 | 12/2007 |

* cited by examiner

*Primary Examiner*—Cephia D Toomer
(74) *Attorney, Agent, or Firm*—Millen, White, Zelano & Branigan, P.C.

(57) ABSTRACT

A diesel fuel formulation containing a high proportion of ethanol has a corrected flash point. This flash point modification is achieved by feeding into the mixture a liquid of low flash point such as a light fraction consisting of a C5 to C7 paraffin cut. The resultant formulation invention can be directly used in a vehicle.

14 Claims, No Drawings

HIGH ETHANOL-CONTENT FUEL COMPOSITIONS

FIELD OF THE INVENTION

The invention relates to the field of new biofuels research, with the objective of reducing $CO_2$ emissions and of diversifying energy resources. The main biofuels used are ethanol (pure or in admixture) for spark-ignition engines and biodiesel (pure or in admixture) for compression-ignition engines. In the U.S.A., the use of diesel vehicles is extensive, especially for trucks and buses. Current innovative research aims to integrate ethanol in a diesel type fuel for a diesel engine application.

BACKGROUND OF THE INVENTION

Direct incorporation of ethanol into diesel fuel is currently limited owing to the low miscibility of ethanol and of a diesel base fuel. Mixtures are thus limited to an incorporation ratio of about 3% by volume of ethanol, or they require the use of cosolvents. Patent application FR-A-2,895,418 filed on behalf of the assignee Institut Francais du Petrole proposes using vegetable oil methyl esters (VOME) as the cosolvent. Thus, the diesel fuel composition described in this patent application allows the incorporation of 10 to 30% by volume of ethanol into a diesel base fuel. Furthermore, a variant consisting of highly hydrotreated oils improves the cetane number otherwise decreased by the presence of ethanol.

Another solution considered for increasing the proportion of ethanol that can be incorporated into diesel fuel consists in using a surfactant additive permitting the ethanol to be suspended in the diesel fuel, thus creating a microemulsion.

However, in some cases, the presence of ethanol in mixtures significantly modifies the values of the flash point, defined as the lowest temperature at which the concentration of the vapours emitted is sufficient to produce a deflagration on contact with a flame or a hot spot, but remains insufficient for self-ignition, a spontaneous combustion in the absence of "pilot" flame. The flash point thus serves to classify liquids into particular categories according to their ignition risks. One thus distinguishes class I flammable liquids (flash point below 55° C.) and class II flammable liquids (flash point above 55° C.). The storage, handling and distribution conditions are of course different depending on the class to which the fuel belongs.

The table below (Table 1) gives the flash point values of some products:

TABLE 1

| Products | Flash point | Fuel category |
| --- | --- | --- |
| gasoline | <−25° C. | Class I |
| kerosene | >38° C. | Class I |
| petroleum-based diesel fuel | >55° C. | Class II |
| ethanol | ~13° C. | Class I |
| rapeseed methyl ester | >120° C. | Class II |

Now, the flash point of mixtures is imposed by the most volatile product, from the moment that its presence reaches some percents (Hansen A. C. et al., Bioresource Technology, 2005 96 (3) 277). Thus, incorporation of some percents of ethanol into mixtures rapidly leads to reduce the flash point of the mixtures and brings it to that of ethanol, i.e. around 13° C. Diesel fuels in admixture with ethanol therefore no longer belong to class II, they are comparable to class I fuels.

However, the flash point values reached are critical and the use of ethanol in diesel fuel may lead, above the liquid, to the existence of a flammable system: these mixtures are then located in risk zones as regards explosiveness. In fact, in the case of gasolines with a very low flash point, the gas overhead in the vehicle gaseous tank consists of an air-fuel mixture that is too rich to ignite. In diesel vehicles, considering the low volatility of diesel fuel, the gas overhead consists on the contrary of too lean a mixture. One solution when the mixtures are based on diesel fuel and ethanol consists in providing all vehicle tanks and storage tanks with a sealed system and a flame arrester equipment. This solution has the drawback of involving modifications and adjustments of the vehicle itself.

A solution consisting in directly improving the fuel formulation so as to obtain mixtures having an acceptable flash point with the conditions of use and storage of the fuel, without requiring engine modifications, appears to be more promising. The present invention lies within this scope.

SUMMARY OF THE INVENTION

The present invention aims to formulate a high ethanol-content diesel fuel having a flash point value that is greatly below the ambient temperature and close to the values obtained for standard gasolines. Thus, these fuel compositions are outside the risk zones as regards explosiveness.

DETAILED DESCRIPTION

The object of the invention described in the present patent application is to provide a diesel fuel composition allowing direct incorporation of large amounts of ethanol together with a significant flash point decrease of the diesel-biodiesel-ethanol mixture obtained. This flash point value decrease is obtained by adding to the mixture a liquid compound that is even more volatile than ethanol, with a flash point below −4° C.

The diesel fuel composition according to the present invention is characterized in that it essentially consists of a mixture made up of:

- 10 to 30% by volume of ethanol,
- 20 to 60% by volume of a mixture of vegetable oil alkyl esters,
- 30 to 60% by volume of at least one diesel base fuel or cut, and
- 1 to 15% by volume of a light liquid compound whose flash point is below −4° C.

Another object of the present invention is the direct use of this diesel fuel composition in a diesel vehicle and in particular for fleets of vehicles.

The flash point of said composition thus is lower than that of ethanol and it is therefore acceptable with the conditions of storage and of use of the fuel. Such a composition is the explosiveness risk zones by limiting the existence of a flammable system above the liquid. With a flash point close to that of gasolines, the gas overhead of the vehicle tank consists of an air-fuel mixture that is too rich to ignite.

Said composition according to the present invention preferably has a flash point below 6° C. More preferably, said composition has a flash point below 0° C.

The liquid compound having a flash point below −4° C. preferably is a C5 to C7 paraffin cut. In addition to the flash point value decrease of the mixture, incorporation of such a cut allows to valorize, within the refinery, a fraction of the light cuts via the is diesel fuel pool.

The flash point values of compounds from a C5-C7 paraffin cut are given in the table hereafter (Table 2):

TABLE 2

| Products | Flash point | Boiling-point temperature |
|---|---|---|
| n-pentane | −49° C. | 36° C. |
| iso-pentane | <−51° C. | 28° C. |
| n-hexane | −22° C. | 68° C. |
| iso-hexane | −32° C. | 60° C. |
| cyclohexane | −20° C. | 81° C. |
| n-heptane | −4° C. | 98° C. |
| iso-heptane | −18° C. | 90° C. |

The C5-C7 paraffin cuts used in the mixtures according to the present invention are preferably selected from among iso-pentane and iso-hexane.

Preferably, the fuel compositions comprise between 4 and 12% by volume of light liquid compound having a flash point below −4° C.

The diesel base or cut present in the diesel fuel composition according to the invention represents 30 to 60% by volume, preferably 35 to 45% by volume, of the total fuel composition. This base is selected from among conventional diesel cuts obtained from refining, cuts obtained from hydrocracking, synthetic fuels obtained from resources such as natural gas, coal and biomass, and very highly hydrotreated vegetable oils (deep hydrotreatment of oils allows to obtain exclusively paraffinic feedstocks with no more unsaturations). These various bases engender a distillation curve close to that of a diesel fuel and they also make up for the lowering of the cetane number linked with the high ethanol content of the mixture.

The presence of vegetable oil alkyl esters (vegetable oil methyl esters VOME or vegetable oil ethyl esters VOEE) has the advantage of fulfilling an ethanol accounting function. The alkyl esters content ranges between 20 and 60% by volume, depending on the proportion of ethanol to be introduced into the mixture. The alkyl esters content preferably ranges between 24 and 50% by volume in relation to the total composition of the fuel according to the invention.

The diesel fuel composition comprises 10 to 30% by volume of ethanol, preferably 15 to 25% by volume of ethanol. In order to limit separation problems, anhydrous ethanol is preferably used.

According to a preferred embodiment, the fuel composition according to the present invention essentially consists of a mixture made up of:

15 to 25% by volume of ethanol,
24 to 50% by volume of a mixture of vegetable oil alkyl esters,
30 to 60% by volume of at least one diesel base fuel or cut, and
4 to 12% by volume of a liquid compound whose flash point is below −4° C The diesel fuel can also contain additives commonly used for the formulation and the use of diesel fuels, such as additives improving the cold resistance characteristics, procetane additives, antioxidant additives, detergent additives, antifoam additives or lubricity-improving additives.

The formulation of the fuel composition is preferably implemented by mixing first the alkyl esters with the ethanol, the ester then acting as a cosolvent between the alcohol and the hydrocarbon base. The diesel base fuel or cut and the light liquid compound having a flash point below −4° C. are then incorporated into this premixture. Separation phenomena are thus limited and better stability over time of the mixtures obtained is provided.

The following example illustrates the invention without limiting the scope thereof.

EXAMPLE

A first mixture A comprising 20% by volume of ethanol, 40% by volume of rapeseed oil methyl esters and 40% by volume of synthetic diesel fuel is prepared. The flash point measurement performed by means of the ABEL method (EN ISO 13,736), suited to low flash point values, gives a value around 14.5° C. This value will serve as a reference for the mixtures presented hereafter and containing a variable proportion of C5-C7 paraffin cuts.

Table 3 gives the flash point values for various fuel compositions according to the present invention. Iso-pentane was incorporated into mixtures B1, B2 and B3, whereas the paraffin cut introduced into mixtures C1, C2, C3 and C4 was iso-hexane.

TABLE 3

| Mixtures | Ethanol (% by vol.) | Rapeseed oil methyl esters (% by vol.) | Synthetic diesel fuel (% by vol.) | C5-C7 paraffin cut (% by vol.) | Flash point (° C.) |
|---|---|---|---|---|---|
| A | 20 | 40 | 40 | — | 14.5 |
| B1 | 20 | 40 | 38 | 2 | −2.5 |
| B2 | 20 | 40 | 35 | 5 | <−17 |
| B3 | 20 | 40 | 30 | 10 | <−17 |
| C1 | 20 | 40 | 38 | 2 | 5.5 |
| C2 | 20 | 40 | 35 | 5 | −3 |
| C3 | 20 | 40 | 33 | 7 | −8 |
| C4 | 20 | 40 | 30 | 10 | <−17 |

Introduction of iso-pentane or iso-hexane into the composition thus considerably lowers the flash point values of the fuel so as to be outside the explosiveness risk zones.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 07/08.375, filed Nov. 30, 2007, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A high ethanol-content diesel fuel composition, comprising a mixture of:
   10 to 30% by volume of ethanol,
   20 to 60% by volume of a mixture of vegetable oil alkyl esters,
   30 to 60% by volume of at least one diesel base fuel or cut, and
   1 to 15% by volume of a liquid compound whose flash point is below -4° C.

2. A composition as claimed in claim 1, comprising a mixture of:
   15 to 25% by volume of ethanol,
   24 to 50% by volume of a mixture of vegetable oil alkyl esters,
   30 to 60% by volume of at least one diesel base fuel or cut, and
   4 to 12% by volume of a liquid compound whose flash point is below -4° C.

3. A composition as claimed in claim 1, wherein said liquid compound having a flash point below -4° C. is a C5-C7 paraffin cut.

4. A composition as claimed in claim 3, wherein said C5-C7 cut is iso-pentane or iso-hexane.

5. A composition as claimed in claim 1, wherein the diesel base fuel or cut comprises at least one of (a) diesel cuts obtained from refining, (b) cuts obtained from hydrocracking, (c) synthetic fuels obtained from natural gas, coal or biomass, and (d) very highly hydrotreated vegetable oils.

6. A composition as claimed in claim 1, further comprising at least one additive selected from among additives improving the cold resistance characteristics, procetane additives, antioxidant additives, detergent additives, antifoam additives and lubricity-improving additives.

7. A diesel fuel composition according to claim 1, wherein the vegetable oil alkyl ester comprises rapeseed oil methyl esters.

8. A diesel fuel composition according to claim 2, wherein the vegetable oil alkyl ester comprises rapeseed oil methyl esters.

9. A diesel fuel composition according to claim 3, wherein the vegetable oil alkyl ester comprises rapeseed oil methyl esters.

10. A diesel fuel composition according to claim 4, wherein the vegetable oil alkyl ester comprises rapeseed oil methyl esters.

11. A diesel fuel composition according to claim 10, wherein the at least one diesel base fuel or cut is a synthetic diesel fuel.

12. A composition as claimed in claim 8, wherein said C5-C7 cut is iso-pentane or iso-hexane.

13. A process for producing the fuel composition of claim 1, comprising first mixing the vegetable oil alkyl ester with the ethanol, and to the resultant mixture incorporating the diesel base oil or cut and the liquid compound having a flash point below −4° C.

14. A fuel composition produced according to claim 13.

* * * * *